(12) United States Patent
Zid et al.

(10) Patent No.: US 9,369,784 B2
(45) Date of Patent: Jun. 14, 2016

(54) OPTICAL ARBITRATION DEVICE AND METHOD IN A NETWORK-ON-CHIP SYSTEM

(71) Applicant: COMMISSARIAT A L'ENERGIE ATOMIQUE ET AUX ENE ALT, Paris (FR)

(72) Inventors: Mounir Zid, Grenoble (FR); Yvain Thonnart, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 35 days.

(21) Appl. No.: 14/561,372

(22) Filed: Dec. 5, 2014

(65) Prior Publication Data

US 2015/0163570 A1    Jun. 11, 2015

(30) Foreign Application Priority Data

Dec. 9, 2013    (FR) ...................................... 13 62301

(51) Int. Cl.
*H04Q 11/00* (2006.01)
*H04B 10/278* (2013.01)
(Continued)

(52) U.S. Cl.
CPC ......... *H04Q 11/0005* (2013.01); *H04B 10/278* (2013.01); *H04B 10/801* (2013.01); *H04J 14/028* (2013.01); *H04J 14/0272* (2013.01); *H04J 2203/0098* (2013.01); *H04Q 2011/005* (2013.01); *H04Q 2011/0064* (2013.01)

(58) Field of Classification Search
CPC ................... H04Q 11/0005; H04Q 2011/005; H04Q 2011/0064; H04B 10/278; H04B 10/80; H04J 14/0272; H04J 14/028; H04J 2203/0098
See application file for complete search history.

(56) References Cited

U.S. PATENT DOCUMENTS

| | | | | | |
|---|---|---|---|---|---|
| 6,014,384 A | * | 1/2000 | Weberhofer | ........ | H04L 12/5602 370/230 |
| 6,078,337 A | * | 6/2000 | Fukui | .................. | G06F 12/0813 345/505 |
| 7,720,377 B2 | * | 5/2010 | Snider | .................... | B82Y 10/00 370/352 |

(Continued)

OTHER PUBLICATIONS

William J. Dally et al., "Principles and Practices of Interconnection Networks", Morgan Kaufmann, 2004, pp. 252-255 and additional pages.

(Continued)

*Primary Examiner* — Li Liu
(74) *Attorney, Agent, or Firm* — Oblon, McClelland, Maier & Neustadt, L.L.P.

(57) ABSTRACT

An optical arbiter device, between conflicting access requests to a shared resource sent by N processing nodes of a network-on-chip system, comprising at least one primary optical arbiter bus, at least one optical source for transmitting a first optical signal in said at least one primary optical arbiter bus, and a sequence of N optical arbiter cells coupled with the primary optical arbiter bus, each of these optical arbiter cells being associated with a processing node and having means for selecting the processing node with which said each optical arbiter cell is associated by re-routing the first optical signal. The optical source is designed to transmit a second optical signal propagated in an opposite direction to the first optical signal along the primary optical arbiter bus. Furthermore, the selection means of each optical arbiter cell are designed to perform said selection by re-routing the first and second optical signals.

13 Claims, 4 Drawing Sheets

(51) Int. Cl.
*H04B 10/80* (2013.01)
*H04J 14/02* (2006.01)

(56) References Cited

U.S. PATENT DOCUMENTS

| | | | | | |
|---|---|---|---|---|---|
| 8,335,434 | B2* | 12/2012 | Beausoleil | ......... | G02B 6/12007 398/141 |
| 8,385,740 | B2* | 2/2013 | O'Krafka | ............. | H04L 12/413 398/33 |
| 8,938,169 | B2* | 1/2015 | Binkert | ............ | H04L 12/40163 398/79 |
| 2009/0274413 | A1* | 11/2009 | Beausoleil | ........... | H04B 10/801 385/14 |
| 2011/0058812 | A1* | 3/2011 | Ty Tan | ................ | H04B 10/278 398/66 |
| 2011/0069963 | A1* | 3/2011 | McLaren | ........... | G02B 6/12007 398/115 |
| 2011/0097086 | A1* | 4/2011 | Binkert | ............. | G02B 6/12007 398/71 |
| 2012/0087674 | A1* | 4/2012 | Roberts | ................... | G02B 6/43 398/141 |

OTHER PUBLICATIONS

Dana Vantrease et al., "Corona: System Implications of Emerging Nanophotonic Technology", ISCA Proceedings of the 35$^{th}$ Annual International Symposium on Computer Architecture, 2008, pp. 153-164.

French Preliminary Search Report issued Jul. 29, 2014 in French Application 13 62301, filed on Dec. 9, 2013 ( with English Translation of categories of Cited Documents).

Dana Vantrease et al. "Light Speed Arbitration and Flow Control for Nanophotonic Interconnects", Microarchitecture, 2009, 12 pages.

Marco Ajmone Marsan et al. "All-Optical WDM Multi-Rings with Differentiated QoS", IEEE Communications Magazine, vol. 37, No. 2, 1999, 9 pages.

Dr. Andrew Wilson "SSA: A High-Performance Serial Interface for Unparalleled Connectivity", Digest of Papers of Compcon, 1996, 6 pages.

* cited by examiner

OPTICAL ARBITRATION DEVICE AND METHOD IN A NETWORK-ON-CHIP SYSTEM

The present invention relates to an optical arbiter device between conflicting access requests to a shared resource, these conflicting requests being sent by a plurality of N processing nodes of a network-on-chip system. It also relates to a corresponding method.

It is applicable in the field of photonics.

BACKGROUND OF THE INVENTION

Photonics represents a very promising technological platform for designing high-performance systems, with increasingly high bandwidth requirements.

By way of example, the novel multi-processor systems are capable of providing extremely high computing power requiring data transfer speeds greater than 100 Terabit/s. These data transfer speeds may be necessary for data exchanges between processing cores, particularly within a multi-core processor.

At the present time, optical interconnections are the only technology capable of transmitting such speeds. They can be achieved by the optical interconnections particularly using the Wavelength Division Multiplexing (WDM) technique. This technique makes it possible to propagate a plurality of optical signals of different wavelengths simultaneously in the same optical waveguide, without any risk of collision between the different signals. Wavelength multiplexing represents an economical solution for increasing the bandwidth capacity of the waveguide.

In more concrete terms, photonics is a promising technology for designing network-on-chip systems, since it makes it possible, besides the increase in the bandwidth, to do away with problems associated with the high density of electrical interconnections in this type of electronic systems by providing interconnections having a small size.

The use of optical interconnections instead of electrical interconnections in integrated circuits offers two further advantages. Firstly, the transmission of an optical signal via a waveguide makes it possible to shorten transmission times and thus reduce transmitted signal loss. Secondly, the loss of the optical signal propagated in the waveguide is independent of the data transfer speed, which may potentially generate energy savings and increases in the performances of the circuits designed in this way.

To be able to use optical interconnections in an integrated circuit, the use of a number of optical devices in the integrated circuit is required. This is the case of the following devices:

- at least one optical source, particularly a laser source, suitable for generating and transmitting an optical signal intended to be propagated in the optical interconnections,
- at least one optical modulator, for example implemented in the form of a microring resonator, for modulating the optical signal,
- at least one optical bus, particularly a silicon waveguide, through which the modulated optical signal is transmitted,
- at least one optoelectronic converter, particularly a photodiode, for detecting the optical signal and converting same into an electrical signal on reaching the destination thereof (i.e. on the arrival thereof at the input of a processing node).

DESCRIPTION OF THE PRIOR ART

Many advances in the field of optical function integration in microelectronic chips have taken place in recent times, opening up innovative prospects for enhancing the performances of integrated circuits. In this way, at the present time, an increasing number of optical or optoelectronic device such as microring resonators, silicon-on-insulator (SOI) waveguides, etc., have been devised to be able to replace some electrical functions in some microelectronic circuits.

These advances have enabled the use of optical interconnections for routing data between the processing nodes of a network-on-chip system.

In practice, an optical switching array for communicating between N processing nodes of a network-on-chip system may consist of an optical bus, particularly a waveguide, and an optical source, particularly external to the system on a chip, for generating the optical signal propagated in this optical bus. This optical signal may comprise a set of N optical signals multiplexed according to the WDM technique described above, each having a different wavelength. This set of multiplexed optical signals is also known to those skilled in the art as an optical frequency comb.

A Multiple-Writer Single-Reader (MWSR) communication scheme may further be used between the N processing nodes, enabling simultaneous access of the N processing nodes to the optical bus for writing data to be transmitted and individual access to this bus of one of these N processing nodes for reading this data.

In order to implement this communication scheme, each of the N processing nodes is read-sensitive at a single wavelength of the optical frequency comb, this wavelength being characteristic of the optical signals sent to this node. On the other hand, each processing node is designed to be able to modulate in write mode an optical signal based on the N−1 wavelengths different to that characterizing same. A processing node can thus modulate and transmit a message to any one of the N−1 other read-sensitive processing nodes at one of these N−1 wavelengths. In this way, each of the N processing nodes controls N−1 optical modulators, each optical modulator being coupled with one of the N−1 wavelengths of the optical frequency comb. An optical modulator may particularly consist of an optical microring resonator used as a switch in order to modulate the optical signal coupled with the resonance frequency thereof. Similarly, each of the N processing nodes controls an optical filter for reading any optical signal sent thereto. This optical filter may also consist of an optical microring resonator for retrieving from the frequency comb only the optical signal of the characteristic wavelength of the node in question. Furthermore, a particular optical bus round trip configuration may enable firstly the transmission of the optical signals in write mode in a first outward direction of the bus, before enabling reading of optical signals transmitted in the bus in a second return direction of the bus.

This communication scheme enables each of the N processing nodes to write and/or read data on the optical bus at the same time as the others, this data being sent to or from other processing nodes. Nevertheless, a plurality of processing nodes may seek to modulate signals of the same wavelength at the same time, which may cause the transmission of a plurality of write signals to the same recipient node at the same time, liable to cause collisions between the data and generate errors in the data transmitted. The nodes involved then need to modulate and send the data again, diminishing the system performances in this way.

In order to prevent collisions between data, a more effective solution than resending data is arbitration between the conflicting write access requests to the same resource (processing node or other) by a plurality of processing nodes, for selecting one of these processing nodes considered to be priority. However, this arbitration is generally carried out in exchange for an additional transmission time generated by the decision-making of the arbiter device implementing same and an increase in the complexity of the integrated circuit.

Furthermore, merely electronic arbiter devices according to the prior art are not suitable for novel high-performance network-on-chip systems including optical devices. Indeed, these arbiter devices frequently use inequitable algorithms, whereby not all the nodes have the same likelihood of access to the share resources, inducing significant lags in data transmission and inefficient use of the network thereof when the number of nodes seeking to access the same shared resource is high. These arbiter devices thus limit the bandwidth performances of the systems designed with optical interconnections.

In order to enhance the efficiency of communication systems, particularly of the MWSR type, using optical interconnections, high-speed arbiter devices based on optical technology are proposed.

The invention thus applies more specifically to an optical arbiter device between conflicting access requests to a shared resource sent by a plurality of N processing nodes of a network-on-chip system, for selecting a processing node from the plurality of N processing nodes seeking to access the shared resource, comprising:
- at least one primary optical arbiter bus,
- at least one optical source for transmitting an optical signal in said at least one primary optical arbiter bus, and
- a sequence of N optical arbiter cells coupled with said at least one primary optical arbiter bus, each of these optical arbiter cells being associated with a processing node from the plurality of N processing nodes and each having means for selecting the processing node with which said each optical arbiter cell is associated by re-routing the optical signal transmitted by the source.

The document by Daily and Towles, entitled "Principles and practices of interconnection networks", published by Morgan Kaufmann in 2004, proposes in pages 252 to 255 an electronic daisy-chain arbiter device. This arbiter device consists of a set of arbiter cells interconnected in series, forming a chain of arbiter cells arranged in succession along this daisy-chain connection. The purpose of each optical arbiter cell is to control access to a shared resource for a processing node assigned thereto. Selecting one of these nodes is based on a predefined priority scheme: each optical arbiter cell is assigned a fixed priority relative to the position thereof in the chain. In this way, the first cell of the chain has the highest priority and the last cell of the chain the lowest priority. In concrete terms, an authorization signal for access to the shared resource travels along the daisy-chain connection in the order of predefined priorities and the first arbiter cell seeking to reserve access to the shared resource for the processing node with which it is associated changes the value of this authorization signal. It changes for example from the value "1", indicating that the resource is available, to the value "0", indicating that access to the resource is now reserved. To free access to the resource once again, the arbiter cell in question simply needs to reset this authorization signal to "1".

By analogy with the technologies available in optics, the teaching from this document makes it possible to devise an optical arbiter device wherein N arbiter cells associated with N processing nodes are arranged in succession along the same primary optical arbiter bus supplied with optical signal by a source to one of the ends thereof, this supply end defining the predefined order of priorities. Each optical arbiter cell thus has means for re-routing the optical signal transmitted by the source so as to reserve access to the shared resource for the processing node with which it is associated. These re-routing means may comprise a microring resonator.

It is understood that when an arbiter cell has re-routed the optical signal for its own use, the arbiter cells arranged downstream along the primary optical arbiter bus cannot reserve access to the shared resource until the optical signal has been freed up again in the optical bus. Consequently, the processing node associated with the arbiter cell having re-routed the optical signal can use the shared resource without risking collision. In this way, advantageously, even if the optical arbiter device is not equitable in terms of priority management, it makes it possible to quickly resolve potential conflicts between a plurality of processing nodes seeking to access the same shared resource. Furthermore, it is readily upgradable, suitable for adapting to any addition of processing nodes in the system. It is simply necessary to add, along the primary optical arbiter bus, the same number of arbiter cells as nodes added in the system, without requiring any further modification.

On the other hand, it is also understood that when a first arbiter cell has re-routed the optical signal for its own use, the arbiter cells arranged upstream along the primary optical arbiter bus are absolutely able to also re-route same. In this way, if a second arbiter cell, situated upstream from the first, re-routes the optical signal in turn, it automatically interrupts the access to the shared resource reserved by the first. Therefore, this causes interruptions in the data transmission.

In order to prevent these untimely interruptions, the article by Vantrease et al, entitled "Corona: system implications of emerging nanophotonic technology", published in ISCA Proceedings of the 35th Annual International Symposium on Computer Architecture, 2008, pages 153-164, proposes a dynamic optical arbiter device based on a so-called "token capture" mechanism. In this article, a plurality of N processing nodes competes for access to a plurality of shared resources. In order to prevent conflicts between the nodes for access to these resources, an optical arbiter device is set up.

This arbiter device comprises a primary waveguide and a ring waveguide. The primary waveguide is supplied by an optical source providing an optical frequency comb propagated in this waveguide, each wavelength of the comb being associated with one of the shared resources. The ring waveguide is used for managing the "token capture" mechanism for allocating the various share resources to the various processing nodes.

N arbiter cells, each associated with one of the plurality of N processing nodes, are arranged between the ring waveguide and the primary waveguide. Each optical arbiter cell has means for re-routing the optical signal propagated in the primary waveguide so as to reserve access of the processing node with which it is associated to one of the shared resources.

The re-routing means may comprise a plurality of pairs of optical filters, for example microring resonators. Each pair of filters comprises, firstly, a first optical filter capable of injecting in the ring waveguide one of the wavelengths of the frequency comb propagated in the primary waveguide, thus generating a corresponding token. Secondly, each pair comprises a second optical filter capable of re-routing one of the tokens propagated in the ring waveguide for its own use. For this reason, the processing node associated with the arbiter cell re-routing a token may use the shared resource associated with the wavelength of the re-routed token without risking collision or interruption. Indeed, when an arbiter cell has re-routed one of the tokens for its own use, none of the other arbiter cells arranged along the ring waveguide has further access to the token: in particular, there is no concept of upstream or downstream arrangement in this ring waveguide. Consequently, the other arbiter cells cannot reserve access to the associated shared resource until this token is once again injected into the ring waveguide by the first optical filter of the cell having re-routed the token.

This arbiter device thus makes it possible to do away with the problems described above in respect of collisions between data and transfer interruptions associated with priorities. Nevertheless, this device is not completely equitable, as not all the nodes have the same likelihood of accessing the shared resources. Indeed, the way the tokens are propagated in the ring waveguide implies that the nodes adjacent to a node freeing up the token, in the direction of propagation of the tokens, have priority for reserving this token.

It may thus be sought to envisage an optical arbiter device that makes it possible to do away with at least some of the problems and constraints mentioned above.

SUMMARY OF THE INVENTION

The invention thus relates to an optical arbiter device between conflicting access requests to a shared resource sent by a plurality of N processing nodes of a network-on-chip system, for selecting a processing node from the plurality of N processing nodes seeking to access the shared resource, comprising:
at least one primary optical arbiter bus,
at least one optical source for transmitting a first optical signal in said at least one primary optical arbiter bus, and
a sequence of N optical arbiter cells coupled with said at least one primary optical arbiter bus, each of these optical arbiter cells being associated with a processing node from the plurality of N processing nodes and each having means for selecting the processing node with which said each optical arbiter cell is associated by re-routing the first optical signal,
wherein:
said at least one optical source is designed to transmit a second optical signal propagated in an opposite direction to the first optical signal in relation to said sequence of N optical arbiter cells along said at least one primary arbiter bus, and
the selection means of each optical arbiter cell are designed to select the processing node with which said each optical arbitercell is associated by re-routing the first and second optical signals.

In this way, by means of the invention, the optical arbiter device enables quick and equitable conflict resolution. Indeed, since the processing node is selected based on the detection of two optical signals propagated in opposite directions in the primary optical arbiter bus, the likelihood of access of each processing node to the shared resources is independent of the arrangement of the arbiter cell thereof along this bus.

Furthermore, this arbiter device is readily upgradable, suitable for adapting at a low cost to any increment in the number of nodes in a circuit. Indeed, adding a new processing node to the network-on-chip system merely involves adding the arbiter device of a new optical arbiter cell associated with this new processing node.

Optionally, the selection means of each optical arbiter cell comprise:
at least one optical filter for re-routing the first and second optical signals,
at least one secondary optical arbiter bus coupled with said at least one optical filter and intended for propagating the re-routed first and second optical signals,
at least one optoelectronic converter connected to one of the ends of said at least one secondary optical arbiter bus for converting the re-routed first and second optical signals into at least one electrical acknowledge signal.

Also optionally, an optical arbiter device according to the invention may comprise:
two optical sources designed to generate the first and second optical signals respectively,
a first primary optical arbiter bus, connected to one of the two optical sources and coupled with the N arbiter cells, wherein the first optical signal is intended to be propagated in a first direction in relation to said sequence of N optical arbiter cells,
a second primary optical arbiter bus, connected to the other of the two optical sources and coupled with the N arbiter cells, wherein the second optical signal is intended to be propagated in a second direction, opposite the first direction, in relation to said sequence of N optical arbiter cells.

Also optionally, an optical arbiter device according to the invention may comprise:
a single optical source,
an optical signal splitter connected at the output of the single optical source, designed to split an optical signal generated by the single optical source into two optical signals of the same wavelength propagated in two splitter output arms, respectively,
a first primary optical arbiter bus, connected to one of the two output arms of the splitter and coupled with the N arbiter cells, wherein one of the two optical signals from the splitter is intended to be propagated as the first optical signal in a first direction in relation to said sequence of N optical arbiter cells, and
a second primary optical arbiter bus, connected to the other of the two output arms of the splitter and coupled with the N arbiter cells, wherein the other of the two optical signals from the splitter is intended to be propagated as the second optical signal in a second direction, opposite the first direction, in relation to said sequence of N optical arbiter cells.

Also optionally, the selection means comprise:
two optical filters for the respective re-routing of the first and second optical signals,
two secondary optical arbiter buses each coupled with one of the two optical filters and each being intended for propagating one of the re-routed first and second optical signals,
two optoelectronic converters each connected to one of the ends of one of the two secondary optical arbiter buses for converting the re-routed first and second optical signals into first and second electrical acknowledge signals.

Also optionally, an optical arbiter device according to the invention may comprise:
two optical sources designed for generating the first and second optical signals, respectively, said signals having different wavelengths,
a single primary optical arbiter bus, connected to the two optical sources respectively at both ends thereof and coupled with the N arbiter cells, wherein the first optical signal is intended to be propagated in a first direction in relation to said sequence of N optical arbiter cells and the second optical signal in a second direction, opposite the first direction, in relation to said sequence of N optical arbiter cells.

Also optionally, the selection means comprise:
two optical filters for the respective re-routing of the first and second optical signals, a single secondary optical arbiter bus coupled with the two optical filters and intended for propagating the re-routed first and second optical signals, two optoelectronic converters respectively connected to both ends of the secondary optical arbiter bus for converting the re-routed first and second optical signals into first and second electrical acknowledge signals.

Also optionally, the selection means comprise:

two optical filters for the re-routing of the first and second optical signals, a single secondary optical arbiter bus coupled with the two optical filters and intended for propagating the re-routed first and second optical signals, a single optoelectronic converter connected to at least one of the two ends of the secondary optical arbiter bus for converting the re-routed first and second optical signals into a single electrical acknowledge signal.

The invention also relates to an optical arbitration method between conflicting access requests to a shared resource sent by a plurality of N processing nodes of a network-on-chip system, for selecting a processing node from the plurality of N processing nodes seeking to access the shared resource, comprising the following steps:

sending a first optical signal via at least one optical source in at least one primary optical arbiter bus with which N successive optical arbiter cells are coupled, each of these optical arbiter cells being associated with a processing node from the plurality of N processing nodes, selecting a processing node by re-routing, via the optical arbiter cell associated with this processing node, the first optical signal, characterized in that:

said at least one optical source transmits a second optical signal propagated in an opposite direction to the first optical signal in relation to said sequence of N optical arbiter cells along said at least one primary optical arbiter bus, and the processing node is selected by re-routing, via the arbiter cell associated with this processing node, the first and second optical signals.

Optionally, selecting the processing node comprises the following steps:

transmission, by each processing node seeking to access the shared resource, of at least one request signal to the optical arbiter cell associated therewith, attempt to re-route, by each optical arbiter cell having received said at least one request signal, the first and second optical signals propagated in opposite directions along said at least one primary optical arbiter bus, conversion, by an optoelectronic converter of the optical arbiter cell having succeeded in re-routing the first optical signal, of the first optical signal into a first electrical acknowledge signal, and transmission of this first electrical acknowledge signal to the processing node associated with this optical arbiter cell, conversion, by an optoelectronic converter of the optical arbiter cell having successfully re-routed the second optical signal, of the second optical signal into a second electrical acknowledge signal, and transmission of this second electrical acknowledge signal to the processing node associated with this optical arbiter cell, one of the processing nodes seeking to access the shared resource being selected if it receives both electrical acknowledge signals in response to the request thereof.

Also optionally, if one of the processing nodes seeking to access the shared resource is selected, it keeps transmitting said at least one request signal to the optical arbiter cell associated therewith for a shared resource access time and stops this transmission on freeing up the shared resource.

Also optionally, any processing node seeking to access the shared resource but only receiving not more than one acknowledge signal in respect to the request thereof, stops the transmission of said at least one request signal for a programmable wait time.

Also optionally, the wait time is computed by each processing node according to a Round Robin arbitration scheme.

BRIEF DESCRIPTION OF THE DRAWINGS

The invention will be understood more clearly using the description hereinafter, given merely by way of example and with reference to the appended figures wherein.

DESCRIPTION OF THE PREFERRED EMBODIMENTS

Figure 1:
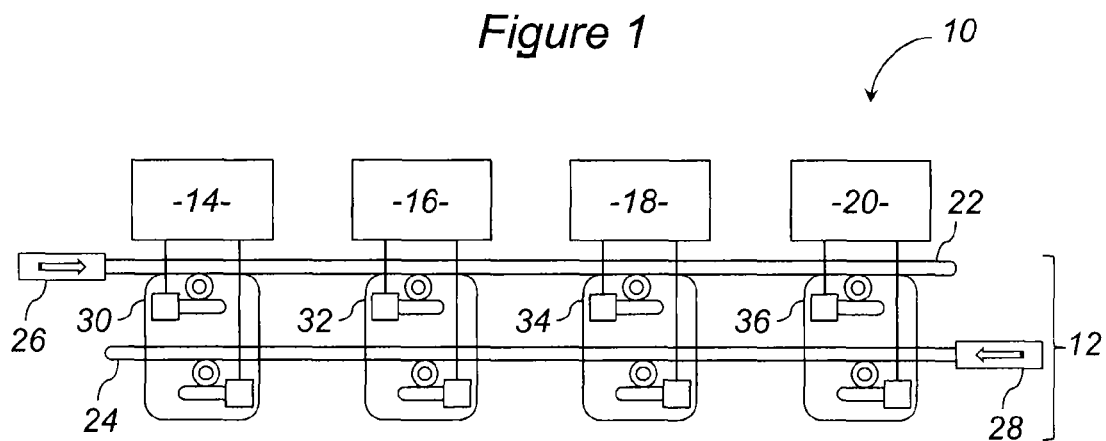
FIG. 1 represents schematically the general structure of a processing node network-on-chip system comprising an optical arbiter device according to a first embodiment of the invention.

FIG. 1 illustrates the general structure of a network-on-chip system 10 comprising an optical arbiter device 12 according to a first embodiment of the invention.

As a general rule, this optical arbiter device 12 is capable of selecting a processing node from a plurality of N processing nodes of the network-on-chip system 10, each of these processing nodes potentially seeking to access a shared resource.

More specifically, FIG. 1 comprises:

four processing nodes 14, 16, 18 and 20 ordered from left to right in the plane of the figure and seeking to access the shared resource, and the optical arbiter device 12.

For purposes of clarity, the shared resource and the connections between the processing nodes and this shared resource are not shown in FIG. 1.

The optical arbiter device 12 comprises first and second primary optical arbiter buses 22 and 24, first and second optical sources 26 and 28, each intended to transmit an optical signal propagated respectively via one of the two primary optical arbiter buses 22 and 24 and a sequence of four optical arbiter cells 30, 32, 34 and 36 arranged from left to right in the plane of the figure along the first and second primary optical arbiter buses 22 and 24.

Each of the optical arbiter cells 30, 32, 34 and 36 is coupled with the two primary optical arbiter buses 22 and 24. Furthermore, each of the optical arbiter cells 30, 32, 34 and 36 is associated with one of the four processing nodes 14, 16, 18 and 20 respectively and is intended to control the access to the shared resource of the processing node associated therewith.

Each of the primary optical arbiter buses 22 and 24 is supplied with an optical signal at one of the ends thereof by one of the optical sources 26 and 28 respectively. In this embodiment, the optical signals transmitted by the optical sources 26 and 28 may equally have the same wavelength or different wavelengths. Each of these optical signals is propagated in one of the two primary optical arbiter buses 22 and 24 in an opposite direction to the other in relation to the sequence of optical arbiter cells 30, 32, 34 and 36 along the two primary optical buses 22 and 24. In this way, the first optical source 26, arranged at the left end, in the plane of FIG. 1, of the first primary optical arbiter bus 22, transmits a first optical signal propagated from left to right via this first primary optical arbiter bus 22. The second optical source 28, arranged at the right end, in the plane of FIG. 1, of the second primary optical arbiter bus 24, transmits a second optical signal propagated from right to left via this second primary optical arbiter bus 24.

Each of the optical arbiter cells 30, 32, 34 and 36 has means for selecting the processing nodes 14, 16, 18 or 20 with which it is associated by re-routing the first and second optical signals mentioned above.

Figure 2:
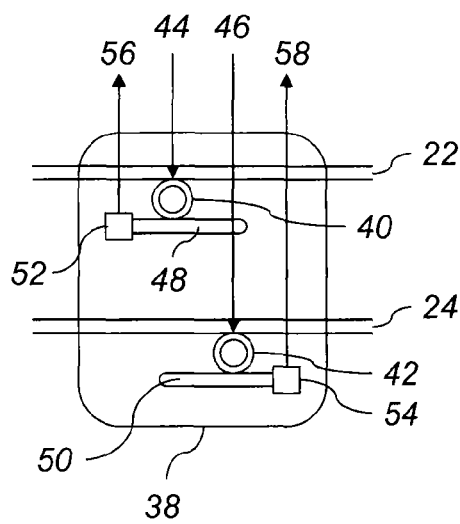
FIG. 2 illustrates in detail an optical arbiter cell of the optical arbiter device in FIG. 1.

FIG. 2 illustrates in detail the selection means of any one of the optical arbiter cells 30, 32, 34 and 36 of the optical arbiter device 12 in FIG. 1 described above, these selection means comprising means for re-routing the first and second optical signals propagated respectively in the first and second primary optical arbiter buses 22 and 24 with which the optical arbiter cell 30, 32, 34 or 36 is coupled. In this figure, the general reference 38 identifies any one of the optical arbiter cells 30, 32, 34 or 36 mentioned above.

The re-routing means of the selection means of the optical arbiter cell 38 comprise two optical filters 40 and 42 coupled respectively with the first and second primary optical arbiter buses 22 and 24 for re-routing the first and second optical signals propagated in these two primary optical arbiter buses 22 and 24.

The processing node 14, 16, 18 or 20 associated with the optical arbiter cell 38, when seeking to access the shared resource, thus transmits two request signals 44 and 46 to the optical arbiter cell 38, more specifically respectively intended for the two optical filters 40 and 42. On receipt of these two request signals, the two optical filters 40 and 42 are activated and attempt to respectively re-route the first and second optical signals propagated in the two primary optical arbiter buses 22 and 24. Each optical filter 40 or 42 may particularly be embodied using a microring resonator. It should be noted that, alternatively, for some applications, the two request signals 44 and 46 may make reference to the same single request signal intended for the optical arbiter cell 38.

The selection means of the optical arbiter cell 38 further comprise two secondary optical arbiter buses 48 and 50 coupled respectively with the two optical filters 40 and 42 and intended for propagating one of the re-routed first and second optical signals. Two optoelectronic converters 52 and 54, for example photodiodes, are connected respectively to one of the ends of the two secondary optical arbiter buses 48 and 50 for converting the re-routed first and second optical signals into first 56 and second 58 electrical acknowledge signals returned if applicable to the processing node 14, 16, 18 or 20 associated with the optical arbiter cell 38.

The selection of one processing node from a plurality of processing nodes seeking to access the shared resource is based on a predefined priority diagram. It will now be demonstrated that, using an arbiter device according to the invention, such as for example that described above, all the processing nodes 14, 16, 18 and 20 have the same average likelihood of accessing the shared resource and consequently that an optical arbiter device according to the invention is equitable in terms of priority management.

In the embodiment illustrated in FIG. 1, each optical arbiter cell 30, 32, 34 or 36 is assigned two priorities relating to the position thereof in relation to the direction of propagation of the first and second optical signals in the two primary optical arbiter buses 22 and 24. In this way, the optical arbiter cell 30 first receiving the first optical signal transmitted by the optical source 26 in the first primary optical arbiter bus 22 has the highest priority, for example "4", this priority decreasing progressively from "3" to "1" for the optical arbiter cells 32, 34 and 36 arranged successively downstream in the direction of propagation of the first optical signal. The same optical arbiter cell 30 is the last to receive the second optical signal transmitted by the optical source 28 in the second primary optical arbiter bus 24 and in this case has the lowest priority, for example "1", this priority increasing progressively from "2" to "4" for the optical arbiter cells 32, 34 and 36 arranged successively upstream in the direction of propagation of the second optical signal. In this way, by averaging these priorities in pairs since the criterion for selecting a processing node is based on the re-routing of the two optical signals propagated in opposite directions in the two primary optical arbiter buses 22 and 24, it results that the predefined average priority of each optical arbiter cell is the same as for the others and, in this case, equal to 5/2.

Generalizing to N optical arbiter cells, the predefined average priority is the same for all the optical arbiter cells and equal to (N+1)/2.

Figure 3:
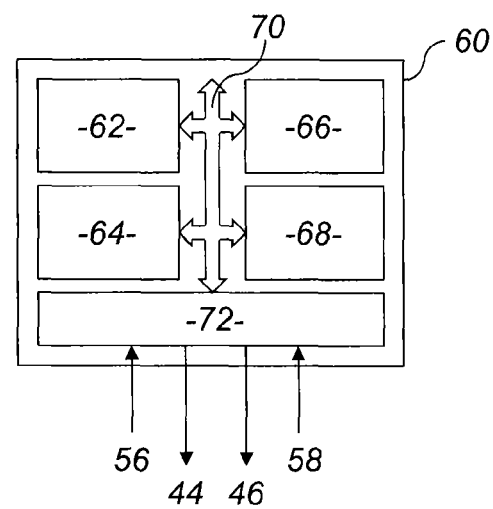
FIG. 3 represents schematically the possible general structure of one of the processing nodes of the network-on-chip system in FIG. 1.

By way of example, FIG. 3 represents schematically a possible implementation of one of the processing nodes in FIG. 1. In this way, the general reference 60 identifies any one of the processing nodes 14, 16, 18 and 20 mentioned above. This processing node 60 may comprise a plurality of data processing modules 62, 64, 66 and 68, particularly processor cores, dedicated chips, memories, etc. the data processing modules 62, 64, 66 and 68 are connected by a data processing bus 70 enabling data exchanges between same. The processing node may further comprise a control module 72 also connected to the data processing bus 70 for data exchanges between each data processing module 62, 64, 66 and 68 and the control module 72. This control module 72 enables communication of each of the processing modules 62, 64, 66 and 68 with the optical arbiter device 12.

In this example of implementation, the control module 72 is part of the processing node 60, but in other alternative embodiments, it may be positioned outside the processing node 60. Also, in this example of implementation, four data processing modules 62, 64, 66 and 68 are integrated in the processing node 60, but in other alternative embodiments, this number of processing modules may be greater or less.

The communication between the processing node 60 and the optical arbiter device 12 is performed using four electrical connections positioned between the control module 72 and the optical arbiter cell 38 associated with the processing node 60. In this way, when the processing node 60 seeks to access the shared resource, it transmits, using the control module 72 and via two of the four electrical connections mentioned above, the two request signals 44 and 46 to the optical arbiter cell 38 associated therewith. Once the optical arbiter cell 38 succeeds in obtaining access to the shared resource by re-routing the first and second optical signals transiting in the two primary optical arbiter buses 22 and 24, it transmits to the processing node 60 the two electrical acknowledge signals 56 and 58.

Figure 4:
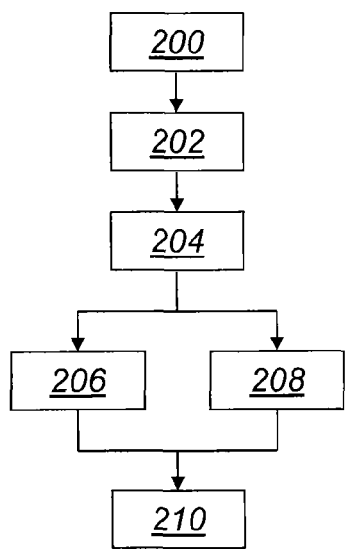
FIG. 4 illustrates the successive steps of an optical arbitration method according to one embodiment of the invention, for example implemented by the optical arbiter device in FIG. 1.

FIG. 4 illustrates the successive steps of an optical arbitration method suitable for being implemented using an optical arbiter device according to the invention, particularly using the optical arbiter device 12 illustrated in FIG. 1. This optical arbitration method makes it possible to select one of a plurality of processing nodes seeking to access the shared resource in a potentially conflicting fashion.

During a first step 200 for starting up the optical arbiter device 12, the first optical source 26 generates and continuously transmits the first optical signal in the first primary optical arbiter bus 22. This first optical signal is propagated in a first direction, from left to right in FIG. 1, so as to pass first at the optical arbiter cell 30, followed by the optical arbiter cell 32, followed by the optical arbiter cell 34, followed by the optical arbiter cell 36.

During the same step 200, the second optical source 28 generates and continuously transmits the second optical signal in the second primary optical arbiter bus 24. This second optical signal is propagated in a second direction opposite the first, from right to left in FIG. 1, so as to pass first at the optical arbiter cell 36, followed by the optical arbiter cell 34, followed by the optical arbiter cell 32, followed by the optical arbiter cell 30.

During a subsequent step 202, each processing node 14, 16, 18 or 20 seeking to access the shared resource simultaneously transmits the two request signals 44 and 46 to the optical arbiter cell 30, 32, 34 or 36 associated therewith.

During a step 204, each optical arbiter cell 30, 32, 34 or 36 having received the request signals 44 and 46 tries to re-route the first and second optical signals propagated in opposite directions respectively along the two primary optical arbiter buses 22 and 24.

During a subsequent step 206, the optoelectronic converter of the optical arbiter cell having successfully re-routed the first optical signal, converts this first optical signal into a first electrical acknowledge signal 56, and transmits this first electrical acknowledge signal 56 to the processing node associated with this optical arbiter cell.

During a step 208, performed before, during or after the step 206, but after the step 204, the optoelectronic converter of the optical arbiter cell having successfully re-routed the second optical signal, converts this second optical signal into a second electrical acknowledge signal 58, and transmits this second electrical acknowledge signal 58 to the processing node associated with this optical arbiter cell.

During a final step 210, one of the processing nodes seeking to access the shared resource is selected if it receives the two electrical acknowledge signals 56 and 58 in response to the request thereof.

In this way, an optical arbiter cell should re-route for its own use the two optical signals circulating in opposite directions in the two primary optical buses to give access to the shared resource to the processing node associated therewith.

Nevertheless, when an optical arbiter cell re-routes for its own use only one of the two optical signals, it does not obtain access rights to the shared resource but prevents the rest of the optical arbiter cells from accessing this optical signal and, consequently, from accessing the shared resource until the optical signal re-routed thereby has been freed up once again in the corresponding primary optical arbiter bus.

Figure 5:
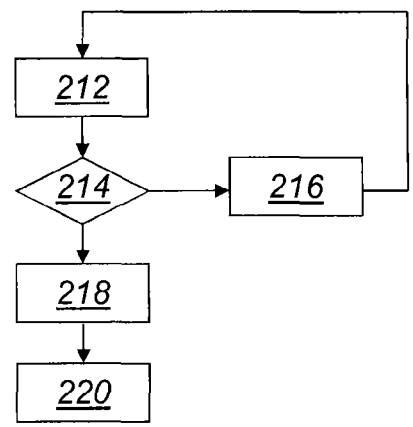
FIG. 5 illustrates the successive steps of a method for controlling a processing node of the network-on-chip system in FIG. 1, implemented during the execution of the optical arbiter method in FIG. 4, FIGS. 6 and 7 represent schematically the general structure of a network-on-chip system comprising an optical arbiter device according to second and third embodiments of the invention.

FIG. 5 thus illustrates the successive steps of a control method used when performing the optical arbitration method detailed above, to prevent any blocking situation. This method is performed by the control module 72 of each processing node, represented in FIG. 3 by the general reference 60, when the latter seeks to access the shared resource.

During a first step 212, the control module 72 transmits the two request signals 44 and 46 to the optical arbitration cell 38 associated with the processing node 60.

During a subsequent step 214, the control module 72 checks the expected receipt of the electrical acknowledge signals 56 and 58 from the optical arbiter cell 38 in response to the request thereof. If the control module 72 receives not more than one electrical acknowledge signal in response to the request thereof, it infers that the request thereof is not acknowledged.

In this case, during a subsequent step 216, the control module 72 stops transmitting the two request signals 44 and 46 to the associated optical arbiter cell 38 for a wait time T. It is advisable that this wait time T is different for each control module, as this prevents repeated conflicts between optical arbiter cells for re-routing the first and second optical signals. Indeed, the re-routing attempts by each of the optical arbiter cells will take place at different times if the optical arbiter cells receive the request signals at different times. There are various methods for computing this wait time T described hereinafter.

After this wait time T, the method returns to the step 212 during which the control module 72 re-transmits the two request signals 44 and 46.

The successive steps 212, 214 and 216 described in detail above are repeated until the processing node 60 is selected for access to the shared resource.

If, during the step 214, the control module 72 receives the two electrical acknowledge signals 56 and 58, it infers that the corresponding processing node 60 has been selected.

In this case, the step 214 is followed by a step 218, during which the control module 72 keeps transmitting the two request signals 44 and 46 to the associated optical arbiter cell 38 throughout the access time of the selected processing node 60 to the shared resource. This forces the arbiter cell 38 to keep the first and second optical signals re-routed and thus reserves the exclusive use of the shared resource for the selected processing node 60. This step 218 for maintaining transmission of the request signal is advantageous, since it makes it possible to prevent any interruption of data transmission liable to be caused by other optical arbiter cells seeking to reserve access to the shared resource.

During a final step 220, once the selected processing node 60 frees up the shared resource, the control module 72 stops transmitting the two request signals 44 and 46 to the optical arbiter cell 38, thus enabling access to the shared resource for the other processing nodes.

As mentioned above, there are a plurality of methods for determining the wait time T. This may be defined statically or dynamically.

A static wait time is a wait time assigned to each control module 72 during the design thereof and stored in a specific registry of the control module. As a general rule, the priority of a processing node decreases statistically when the value of the static wait time of the control module thereof increases. In this way, determining a different static wait time for each processing node gives rise to a statistical inequality in the effective access priorities although the predefined priority management according to the invention is in principle equitable.

Alternatively, each processing node 60 may compute dynamically, i.e. while it performs the processing operations thereof, the wait time T of the control module 72 thereof. The value of the dynamically computed wait time T is updated in the specific registry of the control module 72 using a JTAG bus. The advantage of this alternative embodiment is that the dynamic computation of the wait times T may be devised in a statistically equitable manner for all the processing nodes.

The control module 72 in turn may compute the wait time T using a computing function. This computing function is determined during the design of the network-on-chip system, since it needs to be designed so as to minimize the lags of the network-on-chip system and ensure equity between the processing nodes when sharing resources. This function may be merely a random function. It may also comply with an arbitration scheme well-known to those skilled in the art as Round Robin suitable for attributing different wait times to different processing nodes cyclically and without assigning specific priorities thereto. Further more complex functions accounting for numerous parameters such as the number of consecutive failures for accessing the shared resource, the temperature of the processing node, the size of the data to be transmitted, etc., may also be used for computing the wait time T.

Figure 6:
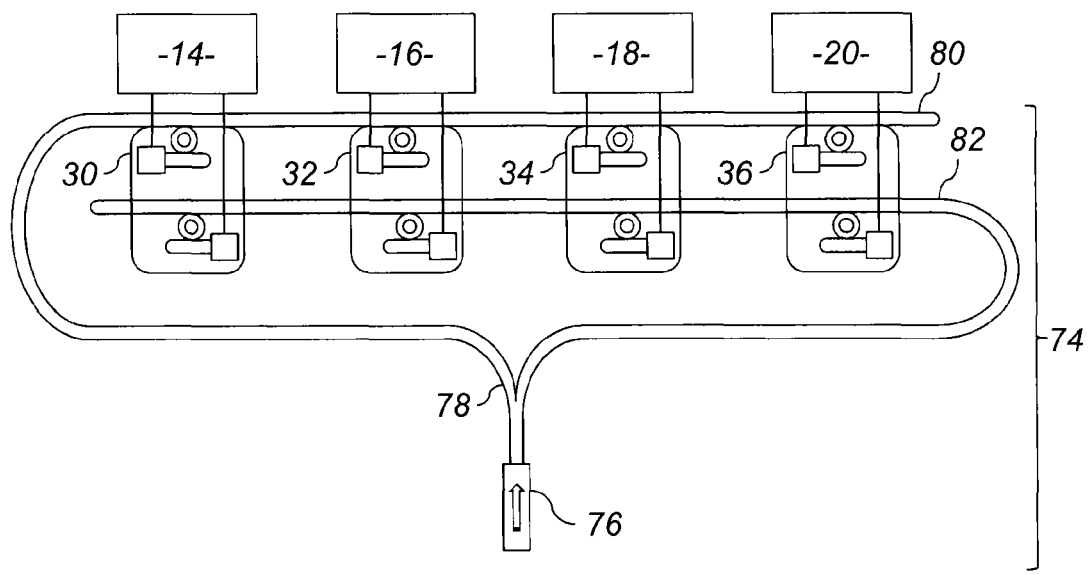

FIG. 6 illustrates the general structure of a network-on-chip system comprising an optical arbiter device 74 according to a second embodiment of the invention.

This optical arbiter device 74 differs from the above in that it comprises a single optical source 76 connected at the output thereof to an optical signal splitter 78, designed to split the optical signal generated by the single optical source 76 into two optical signals of the same wavelength propagated in two splitter output arms respectively.

A first primary optical arbiter bus 80 is connected to one of the two output arms of the splitter 78 and is coupled with the four arbiter cells 30, 32, 34 and 36. One of the two optical signals from the splitter is intended to be propagated as the first optical signal in this first primary optical arbiter bus 80 in a first direction in relation to said sequence of four optical arbiter cells 30, 32, 34 and 36.

A second primary optical arbiter bus 82, connected to the other of the two output arms of the splitter 78 is also coupled with the four optical arbiter cells 30, 32, 34 and 36. The other of the two optical signals from the splitter is intended to be propagated in this second primary optical arbiter bus 82 as the second optical signal in a second direction, opposite the first direction, in relation to said sequence of four optical arbiter cells 30, 32, 34 and 36.

The arbiter cells of this second embodiment of the invention are identical to those of the first embodiment described above with reference to FIGS. 1 and 2. The processing nodes 14, 16, 18 and 20 are also unchanged.

The operating principle of this second embodiment is also identical to that described above with reference to FIGS. 3 to 5.

This second embodiment offers the advantage of being less costly than the previous one as only one optical source 76 is required.

Figure 7:
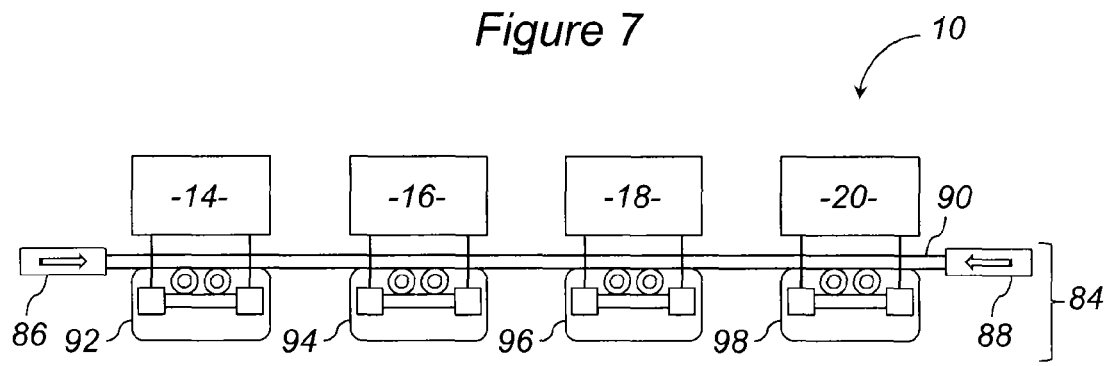

The general structure of a network-on-chip system comprising an optical arbiter device 84 according to a third embodiment of the invention is represented schematically in FIG. 7. The processing nodes 14, 16, 18 and 20 are unchanged.

On the other hand, the optical arbiter device 84 differs from the two previous ones in that it comprises two optical sources 86 and 88 generating the first and second optical signals respectively and transmitting same in a single primary optical arbiter bus 90 in opposite directions. In this case, the two optical signals necessarily have different wavelengths.

The single primary optical arbiter bus 90 is connected to the two optical sources 86 and 88 at both ends thereof respectively and is coupled with four different arbiter cells 92, 94, 96 and 98 to the optical arbiter cells 30, 32, 34 and 36 illustrated in FIGS. 1, 2 and 6. The first optical signal is propagated in this primary optical arbiter bus 90 in a first direction in relation to said sequence of four optical arbiter cells 92, 94, 96 and 98 and the second optical signal in a second direction, opposite the first.

Figure 8:
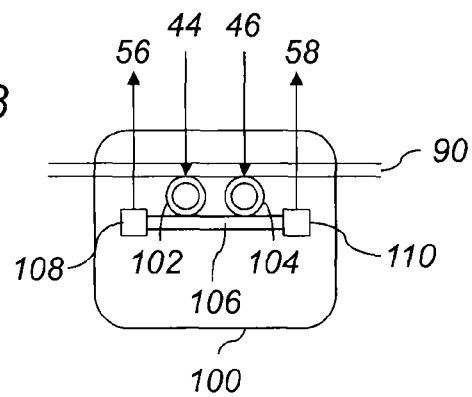
FIG. 8 illustrates in detail an optical arbiter cell of the optical arbiter device in FIG. 7.

FIG. 8 illustrates in detail a possible implementation of any of the optical arbiter cells 92, 94, 96 and 98 of the optical arbiter device 84 in FIG. 7. In this figure, the general reference 100 identifies any one of the arbiter cells 92, 94, 96 and 98.

The re-routing means of the selection means of the optical arbiter cell 100 illustrated in FIG. 8 comprise two optical filters 102 and 104, coupled with the single primary optical arbiter bus 90 and suitable for receiving the two request signals 44 and 46 defined above. Once the optical filters 102 and 104 receive these two request signals 44 and 46, they are activated and try to re-route the first and second optical signals respectively, having different wavelengths, propagated in opposite directions in the single primary optical arbiter bus 90. For this, they are respectively set to the different wavelengths of the two optical signals. In other words, they are not aligned, not resonating for the same frequencies.

The selection means of the optical arbiter cell 100 further comprise a single secondary optical arbiter bus 106 coupled with the two optical filters 102 and 104 and intended for propagating the re-routed first and second optical signals. Two optoelectronic converters 108 and 110, for example photodiodes, connected respectively to both ends of the secondary optical arbiter bus 106 are suitable for converting the re-routed first and second optical signals into the first and second electrical acknowledge signals 56 and 58 defined above.

Advantageously, this third embodiment makes it possible to save one primary optical arbiter bus, and one secondary optical arbiter bus per optical arbiter cell, thus offering a more compact and less costly optical arbiter device than those of the previous embodiments.

The operating principle of this third embodiment is also identical to that described above with reference to FIGS. 3 to 5.

Figure 9:
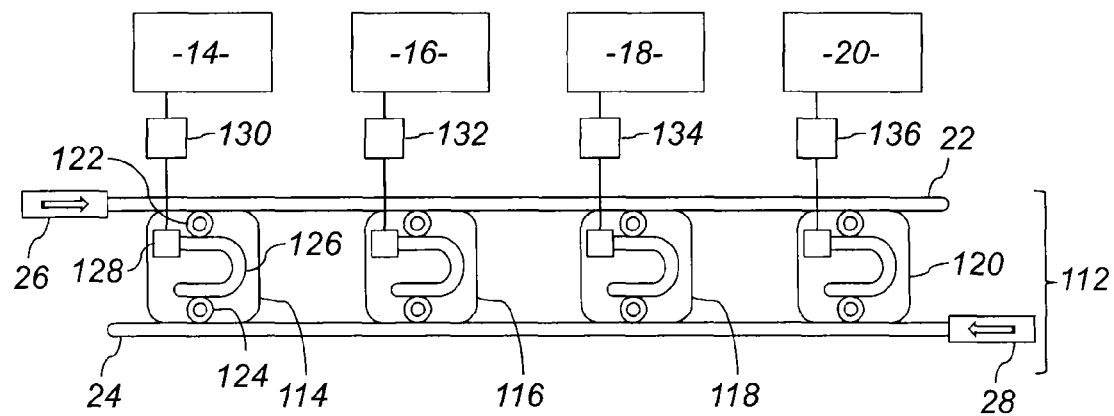
FIG. 9 represents schematically the general structure of a processing node network-on-chip system comprising an optical arbiter device according to a fourth embodiment of the invention.

FIG. 9 illustrates the general structure of a network-on-chip system comprising an optical arbiter device 112 according to a fourth embodiment of the invention.

This optical arbiter device 112 comprises, as for the arbiter device 12 in FIG. 1, both primary optical arbiter buses 22, 24 and both optical sources 26, 28 for identical propagation of the first and second optical signals to that of the first embodiment. Nevertheless, it differs therefrom by the use of four different optical arbiter cells 114, 116, 118 and 120 to the optical arbiter cells 30, 32, 34 and 36 illustrated in FIGS. 1, 2 and 6. The four optical arbiter cells 114, 116, 118 and 120 are also different to the optical arbiter cells 92, 94, 96 and 98 illustrated in FIGS. 7 and 8.

The optical arbiter cell 114 first comprises, as means for re-routing the first and second optical signals, two optical filters 122 and 124 respectively coupled with both primary optical arbiter buses 22, 24 and suitable for receiving the two request signals 44 and 46 defined above. Once the optical filters 122 and 124 receive these two request signals 44 and 46, they are activated and try to re-route the first and second optical signals respectively propagated in opposite directions in the two primary optical arbiter buses 22 and 24.

The optical arbiter cell 114 further comprises a single secondary optical arbiter bus 126 coupled with both optical filters 122 and 124 and intended for propagating the re-routed first and second optical signals. This single secondary optical arbiter bus 126 is configured in return mode, i.e. in a U shape, so as to apply a single direction of propagation of the two re-routed optical signals along this secondary optical arbiter bus 126 towards only one of the ends thereof provided with a single optoelectronic converter 128. The optical filter 124 coupled with the second primary optical arbiter bus 24 is thus for example connected to an outward arm of the secondary optical arbiter bus 126, whereas the optical filter 122 coupled with the first primary optical arbiter bus 22 is connected to a return arm of the secondary optical arbiter bus 126.

The single optoelectronic converter 128, for example a photodiode, is suitable for converting the re-routed first and second optical signals into a single electrical acknowledge signal supplied at the input of a detector 130 of this electrical acknowledge signal, this detector 130 connecting the optical arbiter cell 114 to the processing node 14.

It should be noted that to prevent any untimely leak, towards the first primary optical arbiter bus 22, of the re-routed second optical signal in the secondary optical arbiter bus 126, it is also necessary in this fourth embodiment that the two optical signals have different wavelengths and that the corresponding optical filters 122 and 124 are respectively set to these different wavelengths. Indeed, otherwise, the re-routed second optical signal in any one of the optical arbiter cells 114, 116, 118 and 120 could be partially re-routed a second time by the optical filter 122 to the first primary optical arbiter bus 22. Furthermore, if the wavelengths were identical, the two optical signals re-routed in the secondary optical arbiter bus 126 could interfere with each other, such constructive or destructive interference being then likely to impair the detection thereof.

The optical arbiter cells 116, 118 and 120 are identical to the optical arbiter cell 114 and thus will not be detailed. They are connected respectively to the processing nodes 16, 18 and 20 by detectors 132, 134 and 136 identical to the detector 130.

The processing nodes 14, 16, 18 and 20 are unchanged in relation to the previous embodiments except that they are designed only to receive a single electrical acknowledge signal representing both optical signals re-routed by the optical arbiter cell thereof.

Advantageously, this fourth embodiment makes it possible to save one secondary optical arbiter bus and one optoelectronic converter per optical arbiter cell, thus offering a more compact and less costly optical arbiter device than that of the first embodiment.

On the other hand, this fourth embodiment is not compatible with the second embodiment illustrated in FIG. 6 since the two optical signals must have different wavelengths.

It is likewise not possible to modify the third embodiment illustrated in FIG. 7 by replacing the optical arbiter cells 92, 94, 96 and 98 by the optical arbiter cells 114, 116, 118 and 120 since the third embodiment only has a single primary optical arbiter bus 90. However, to use the same idea as that of the fourth embodiment, it is possible to modify the third embodiment illustrated in FIG. 7 by replacing the optical arbiter cells 92, 94, 96 and 98 not by the optical arbiter cells 114, 116, 118 and 120 but by instances of a further optical arbiter cell 138 in the shape of a hook illustrated in FIG. 10.

This optical arbiter cell 138 comprises, as for the optical arbiter cell 100, both optical filters 102 and 104 coupled with the single primary optical arbiter bus 90 and not aligned, and one of the two optoelectronic converters 108 and 110, identified by the reference 140 in this figure. The other of the two optoelectronic converters and the secondary optical arbiter bus 106 are replaced by a single secondary optical bus 142 in the shape of a hook. The primary arm of this secondary optical arbiter bus 142 is coupled with the optical filter 102 whereas the return arm of the hook of this secondary optical arbiter bus 142 is coupled with the optical filter 104. In this way, the hook shape of this secondary optical arbiter bus 142 carries out the same function as the U shape of the secondary optical arbiter bus 126 in FIG. 9, i.e. applying a single direction of propagation of both re-routed optical signals along this secondary optical arbiter bus 142 by both optical filters 102, 104 towards only one of the ends thereof, that of the primary arm, provided with the single optoelectronic converter 140. The output of the optoelectronic converter 140 then supplies a single electrical acknowledge signal S processed by a detector 144 identical to the detectors 130, 132, 134 and 136 for supplying a binary acknowledge signal CT. The binary acknowledge signal CT takes a first value, for example "1", if the optical arbiter cell 138 has successfully re-routed both optical signals, and a value "0" otherwise.

Figure 10:
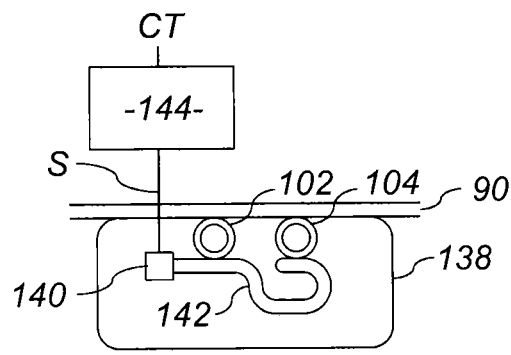
FIGS. 10 and 11 illustrate in detail two possible alternative embodiments of the optical arbiter cell in FIG. 8.
Figure 11:
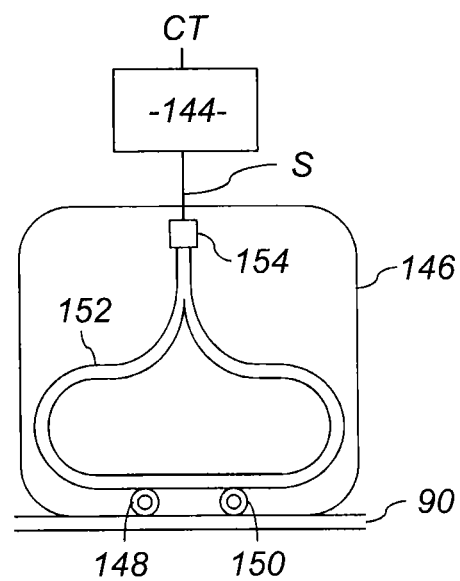

A further alternative embodiment of the optical arbiter cells 114, 116, 118 and 120, compatible with the third embodiment and equivalent to the solution illustrated in FIG. 10, is illustrated in FIG. 11.

According to this alternative embodiment, any one 146 of the optical arbiter cells coupled with the processing nodes 14, 16, 18 and 20 comprises two non-aligned optical filters 148 and 150, coupled with a single primary optical arbiter bus, for example the bus 90 in FIG. 7, and suitable for receiving both request signals 44 and 46 defined above. Once the optical filters 148 and 150 receive these two request signals 44 and 46, they are activated and try to re-route the first and second optical signals, respectively, propagated in opposite directions in the primary optical arbiter bus 90.

The optical arbiter cell 146 further comprises a single secondary optical arbiter bus 152 coupled with both optical filters 148 and 150 and intended for propagating the re-routed first and second optical signals. This single secondary optical arbiter bus 152 is configured in an onion shape, i.e. such that both ends thereof are joined at a single end. In this way, even if both re-routed optical signals are propagated in opposite directions in the secondary optical arbiter bus 152, they are finally joined, at this single end, at the input of a single optoelectronic converter 154. The output of this optoelectronic converter 154, for example a photodiode, then provides the single electrical acknowledge signal S mentioned above processed by the detector 144 defined above.

It should be noted that receiving a single electrical request signal S, instead of the two signals 56 and 58 received in the first three embodiments, does not change the principle of the control method illustrated in FIG. 5. It is merely necessary to replace, in the step 214, the check in respect of the expected receipt of the signals 56 and 58 by a check in respect of the value, "0" or "1", of the binary acknowledge signal CT. CT=0 leads to the step 216 whereas CT=1 leads to the step 218.

The operation of the detector 144, as for that of the detectors 130, 132, 134 and 136, will now be detailed. Indeed, in order to be able to function, this detector 144 should be able to compare at all times the value of the electrical acknowledge signal S to a predefined threshold value Sref for deciding whether both optical signals have been re-routed or not. It should further be suitable for being calibrated for determining this threshold value Sref.

In respect of the comparison of the electrical acknowledge signal S to the predefined threshold value Sref, this can simply be carried out using a comparator, for example an operational amplifier operating in saturated mode.

In respect of calibration, it is necessary to proceed in such a way that the threshold value obtained is appropriate, i.e. neither too high so that the detector is not too selective, nor too low so that the detection is not too unselective.

In particular, an appropriate theoretical threshold value may be given by the following equation:

$$Sref = \max(E_1, E_2) + \max(E_{01}, E_{02}),$$

where $E_1$ is the signal received at the output of the optoelectronic converter 140 or 154 (or 128 in respect of one of the detectors 130, 132, 134 and 136) when only the first optical filter re-routing the first optical signal is activated (i.e. set to the carrier frequency of the first optical signal), $E_2$ is the signal received at the output of the optoelectronic converter 140 or 154 (or 128 in respect of one of the detectors 130, 132, 134 and 136) when only the second optical filter re-routing the second optical signal is activated, $E_{01}$ is the residual electrical signal corresponding to the output of the first optical filter when it is deactivated (i.e. not set to the carrier frequency of the first optical signal) and $E_{02}$ is the residual electrical signal corresponding to the output of the second optical filter when it is deactivated. This appropriate theoretical threshold value assumes that the re-routed optical signals do not interfere, i.e. that the powers thereof are added to form the signal S, which is the case of the embodiments illustrated in FIGS. 7 to 11 since both optical signals do not have the same wavelength.

In practice, the values of $E_{01}$ and $E_{02}$ are not easy to determine. Consequently, assuming that $\min(E_1, E_2) \gg \max(E_{01}, E_{02})$, it is possible to propose a calculation of Sref which is only dependent on E1 and E2, for example according to the following equation:

$$Sref = \max(E_1, E_2) + \frac{\min(E_1, E_2)}{2}.$$

Figure 12:
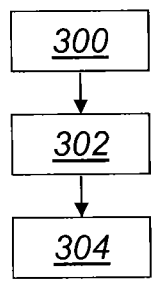
FIG. 12 illustrates the successive steps of a calibration method of an electrical acknowledge signal detector of the network-on-chip system in FIG. 9.

In this way, a method for calibrating the detector 144 associated with the optical arbiter cell 138 or 146 (or of one of the detectors 130, 132, 134, 136 associated with the optical arbiter cells 114, 116, 118, 120) may merely be used, as illustrated in FIG. 12. It may be executed for the start-up or initialization (repeated or not) of the corresponding optical arbiter device, while it is not yet operational but while the first and second optical signals circulate in the primary optical arbiter bus (case of the optical arbiter cell 138 or 146) or the primary optical arbiter buses (case of the optical arbiter cell 114, 116, 118 or 120). It may particularly be implemented during the execution of the step 200 described above.

During a first step 300 of this calibration method, the first optical filter is activated while the second filter is deactivated, for re-routing the first optical signal and the value $E_1$ is measured by the electrical acknowledge signal S.

During a second step 302 of this calibration method, the second optical filter is activated while the first filter is deactivated, for re-routing the second optical signal and the value $E_2$ is measured by the electrical acknowledge signal S.

During a final step 304 of this calibration method, the value of Sref is computed using the two values $E_1$ and $E_2$ measured above.

The computation proposed above for determining Sref as a function of $E_1$ and $E_2$ involves complex electronic implementation due to the min and max functions. It may then by simplified by assuming that $E_1$ and $E_2$ have very similar values. In this case, it is indeed possible to propose a simplified computation of Sref, for example based on the following equation:

$$Sref = G \cdot (E_1 + E_2),$$

where G is a constant value gain between 0.5 and 1. The closer G is to 1, the higher the selectivity of the detector 144.

Figure 13:
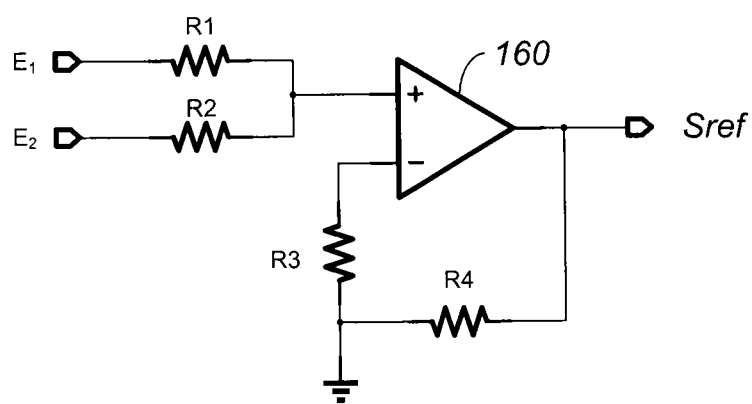
FIG. 13 illustrates in detail the electrical diagram of a calibration element of an electrical acknowledge signal detector of the network-on-chip system in FIG. 9.

If $E_1$ and $E_2$ are voltages, the electronic implementation of such a computation may be merely carried out using an operational amplifier 160 used in a non-inverting summer set-up such as that illustrated in FIG. 13.

According to this set-up, two inputs mounted in parallel on the non-inverting input of the operational amplifier 160 are supplied respectively and sequentially with the voltage values $E_1$ and $E_2$. These two inputs respectively have resistances R1 and R2. The inverting input of the operational amplifier 160, having a resistance R3, is grounded. Finally, the output of the operational amplifier 160 supplies the electrical request signal Sref and is grounded by a feedback loop having a resistance R4.

This results in a manner known per se in the following equation:

$$Sref = \left(1 + \frac{R4}{R3}\right) \cdot \left(\frac{R2 \cdot E_1 + R1 \cdot E_2}{R1 + R2}\right).$$

By suitably choosing R1=R2 and R3=2.R4, this gives G=0.75, an appropriate value of G when $E_1$ and $E_2$ are indeed similar.

It clearly appears that an optical arbiter device such as one of those described above makes it possible to carry out high-speed arbitration, having low noise, low losses and that is insensitive to electromagnetic waves.

Furthermore:

it readily integrates a token lock function,
it is designed independently of the data packet sizes to be transmitted,
it has a short Round Trip Time,
it is robust against token losses,
it enables equitable access of all the processing nodes to a shared resource, including in the case of collisions in access requests,
it uses the waveguide resources at the minimum,
it allows high implementation flexibility, and
it is readily upgradable.

It should further be noted that the invention is not limited to the embodiments described above. Indeed, it will be obvious to those skilled in the art that various modifications may be made to the embodiments described above, in the light of the teaching described herein. In the claims hereinafter, the terms used should not be interpreted as limiting the claims to the embodiments disclosed in the present description, but should be interpreted to include therein any equivalents intended to be covered by the claims due to the wording thereof and which can be envisaged by those skilled in the art by applying general knowledge to the implementation of the teaching disclosed herein.

The invention claimed is:

1. An optical arbiter device between conflicting access requests to a shared resource sent by a plurality of N processing nodes of a network-on-chip system, for selecting a processing node from the plurality of N processing nodes seeking to access the shared resource, comprising:
   at least one primary optical arbiter bus;
   at least one optical source for transmitting a first optical signal in said at least one primary optical arbiter bus; and
   a sequence of N optical arbiter cells coupled with said at least one primary optical arbiter bus, each of these optical arbiter cells being associated with a processing node from the plurality of N processing nodes and each having means for selecting the processing node with which said each optical arbiter cell is associated by re-routing the first optical signal,
   wherein:
   said at least one optical source is designed to transmit a second optical signal propagated in an opposite direction to the first optical signal in relation to said sequence of N optical arbiter cells along said at least one primary optical arbiter bus; and
   the selection means of each optical arbiter cell are designed to select the processing node with which said each optical arbiter cell is associated by re-routing the first and second optical signals.

2. The optical arbiter device according to claim 1, wherein the selection means of each optical arbiter cell comprise:
   at least one optical filter for re-routing the first and second optical signals;
   at least one secondary optical arbiter bus coupled with said at least one optical filter and intended for propagating the re-routed first and second optical signals; and
   at least one optoelectronic converter connected to one of the ends of said at least one secondary optical arbiter bus for converting the re-routed first and second optical signals into at least one electrical acknowledge signal.

3. The optical arbiter device according to claim 1, comprising:
   two optical sources designed to generate the first and second optical signals respectively;
   a first primary optical arbiter bus, connected to one of the two optical sources and coupled with the N arbiter cells, wherein the first optical signal is intended to be propagated in a first direction in relation to said sequence of N optical arbiter cells; and
   a second primary optical arbiter bus, connected to the other of the two optical sources and coupled with the N arbiter cells, wherein the second optical signal is intended to be propagated in a second direction, opposite the first direction, in relation to said sequence of N optical arbiter cells.

4. The optical arbiter device according to claim 3, wherein the selection means comprise:
   two optical filters for the respective re-routing of the first and second optical signals;
   two secondary optical arbiter buses each coupled with one of the two optical filters and each being intended for propagating one of the re-routed first and second optical signals; and
   two optoelectronic converters each connected to one of the ends of one of the two secondary optical arbiter buses for converting the re-routed first and second optical signals into first and second electrical acknowledge signals.

5. The optical arbiter device according to claim 3, wherein the selection means comprise:
   two optical filters for the re-routing of the first and second optical signals;
   a single secondary optical arbiter bus coupled with the two optical filters and intended for propagating the re-routed first and second optical signals; and
   a single optoelectronic converter connected to at least one of the two ends of the secondary optical arbiter bus for converting the re-routed first and second optical signals into a single electrical acknowledge signal.

6. The optical arbiter device according to claim 1, comprising:
   a single optical source;
   an optical signal splitter connected at the output of the single optical source, designed to split an optical signal generated by the single optical source into two optical signals of the same wavelength propagated in two splitter output arms, respectively;
   a first primary optical arbiter bus, connected to one of the two output arms of the splitter and coupled with the N arbiter cells, wherein one of the two optical signals from the splitter is intended to be propagated as the first optical signal in a first direction in relation to said sequence of N optical arbiter cells; and
   a second primary optical arbiter bus, connected to the other of the two output arms of the splitter and coupled with the N arbiter cells, wherein the other of the two optical signals from the splitter is intended to be propagated as the second optical signal in a second direction, opposite the first direction, in relation to said sequence of N optical arbiter cells.

7. The optical arbiter device according to claim 1, comprising:
   two optical sources designed for generating the first and second optical signals, respectively, said signals having different wavelengths; and
   a single primary optical arbiter bus, connected to the two optical sources respectively at both ends thereof and coupled with the N arbiter cells, wherein the first optical signal is intended to be propagated in a first direction in relation to said sequence of N optical arbiter cells and the second optical signal in a second direction, opposite the first direction, in relation to said sequence of N optical arbiter cells.

8. The optical arbiter device according to claim 7, wherein the selection means comprise:
   two optical filters for the respective re-routing of the first and second optical signals;
   a single secondary optical arbiter bus coupled with the two optical filters and intended for propagating the re-routed first and second optical signals; and
   two optoelectronic converters respectively connected to both ends of the secondary optical arbiter bus for converting the re-routed first and second optical signals into first and second electrical acknowledge signals.

9. An optical arbitration method between conflicting access requests to a shared resource sent by a plurality of N processing nodes of a network-on-chip system, for selecting a processing node from the plurality of N processing nodes seeking to access the shared resource, comprising the following steps:
   sending a first optical signal via at least one optical source in at least one primary optical arbiter bus with which N successive optical arbiter cells are coupled, each of these optical arbiter cells being associated with a processing node from the plurality of N processing nodes;

selecting a processing node by re-routing, via the optical arbiter cell associated with this processing node, the first optical signal, wherein:

said at least one optical source transmits a second optical signal propagated in an opposite direction to the first optical signal in relation to said sequence of N optical arbiter cells along said at least one primary optical arbiter bus; and the processing node is selected by re-routing, via the arbiter cell associated with this processing node, the first and second optical signals.

10. The optical arbitration method according to claim 9, wherein selecting the processing node comprises the following steps:

transmission, by each processing node seeking to access the shared resource, of at least one request signal to the optical arbiter cell associated therewith;

attempt to re-route, by each optical arbiter cell having received said at least one request signal, the first and second optical signals propagated in opposite directions along said at least one primary optical arbiter bus;

conversion, by an optoelectronic converter of the optical arbiter cell having succeeded in re-routing the first optical signal, of the first optical signal into a first electrical acknowledge signal, and transmission of this first electrical acknowledge signal to the processing node associated with this optical arbiter cell; and conversion, by an optoelectronic converter of the optical arbiter cell having successfully re-routed the second optical signal, of the second optical signal into a second electrical acknowledge signal, and transmission of this second electrical acknowledge signal to the processing node associated with this optical arbiter cell, one of the processing nodes seeking to access the shared resource being selected if it receives both electrical acknowledge signals in response to the request thereof.

11. The optical arbitration method according to claim 10, wherein, if one of the processing nodes seeking to access the shared resource is selected, it keeps transmitting said at least one request signal to the optical arbiter cell associated therewith for a shared resource access time and stops this transmission on freeing up the shared resource.

12. The optical arbitration method according to claim 10, wherein any processing node, seeking to access the shared resource but only receiving not more than one acknowledge signal in respect to the request thereof, stops the transmission of said at least one request signal for a programmable wait time.

13. The optical arbitration method according to claim 12, wherein the wait time is computed by each processing node according to a Round Robin arbitration scheme.

* * * * *